United States Patent Office 3,485,810
Patented Dec. 23, 1969

3,485,810
NOVEL AMINO ACID PROTECTING GROUPS
Manohar A. Tilak, Indianapolis, Ind., assignor to Eli Lilly and Company, Indianapolis, Ind., a corporation of Indiana
No Drawing. Filed July 24, 1967, Ser. No. 655,285
Int. Cl. C08f 27/08
U.S. Cl. 260—88.2    4 Claims

ABSTRACT OF THE DISCLOSURE

Resin containing novel reactive fragments attached to a styrene-divinylbenzene copolymer, useful as C-terminal protecting group in peptide synthesis, allows use of benzyloxycarbonyl protecting group for the amine function.

BACKGROUND OF THE INVENTION

This invention pertains to novel substances for the protection of the carboxylic acid function of amino acids in peptide synthesis.

Since peptides are important biological substances, and their isolation from biological systems in a pure state is difficult, it is necessary to prepare these materials by synthetic chemical methods. These methods involve as a fundamental step the coupling of two or more amino acids in a manner to form an amido linkage between the molecules:

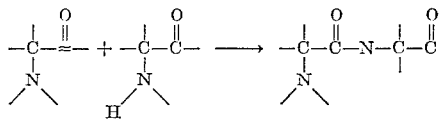

Since amino acids are at least bifunctional, it is also necessary for the chemist, prior to the coupling process, to render inactive all functionalities in a given amino acid which are not directly used in the coupling process. If reactive functionalities are allowed to remain, yields will be lower and purifications made difficult because of the presence of large amounts of unwanted by-products from the interaction of these functionalities. Several methods are well known to the chemist for rendering inactive the functionalities of simple amino acids with protecting groups in such a manner that only the desired functional group is available to react when the amido linkage is formed. It is necessary for the so-called "protecting group" to be readily attached to the amino acid before amide formation and to be readily removed from the resulting peptide, after coupling, without simultaneous rupture of the newly formed amide linkage. Two types of protecting groups are necessary in peptide synthesis: the C-terminal protecting groups, those groups which render the acid portion of the amino acid inactive, as for example, alcohol derivatives, to prepare esters; amine derivatives, to prepare amides; and the like; and the N-terminal protecting groups, those groups which render the amine portion unreactive, such as benzoxycarbonyl, trityl, allyloxy, and the like. It is with the C-terminal or carboxylic acid protecting group that this invention is concerned.

Merrifield, J. Am. Chem. Soc., 85, 2149 (1963), has disclosed a method of "solid state" peptide synthesis wherein an amino acid which eventually will form the C-terminal amino acid of the completed peptide is reacted with a chloromethyl moiety attached to a styrene-divinylbenzene copolymer in the form of a solid resin. This reaction binds the C-terminal amino acid at the carboxylic acid function as an inactive ester, and the amine function then is free to form a peptide linkage. Esterification is effected by reaction of the triethylammonium salt of the amino acid with the benzyl halide resin in an unreactive solvent at or above ambient room temperature. The resulting amino acid-resin ester can then be reacted in a two-phase (solid-liquid) system with a solution of the N-protected amino acid which will eventually form the second fragment of the peptide molecule. This amide-forming reaction can be caused to occur by activating the carboxylic acid function of the adding amino acid, as for example by the use of dicyclohexylcarbodiimide, by conversion to the acid halide, acid anhydride, or mixed anhydride, or like methods well known to those skilled in the art. After washing off with the excess reactants, the N-terminal protecting group can be removed, and the resin containing two amino acids can be subsequently reacted with a different N-protected amino acid to build up a tripeptide. Repetition of the N-protecting group removal and amidification can build up long-chain peptides in a manner well described by the prior art. As a final step, the completed peptide can be removed from the resin by contacting the peptide-resin with hydrogen bromide in glacial acetic acid.

Merrifield, Biochem., 3, 1385 (1964), used the tert.-butoxycarbonyl protecting group which allowed the N-protecting group to be removed with 1 N hydrogen chloride in acetic acid. Attempts at modification of the resin such as by nitration or bromination to allow use of the benzyloxycarbonyl N-protecting group have been largely unsuccessful. Merrified, J. Am. Chem. Soc., 85, 2149 (1963). The N-benzyloxy carbonyl group could only be removed by treatment of the protected peptide with hydrogen bromide in acetic acid, a technique that also splits the ester bond of the C-terminal protecting group.

SUMMARY

This invention relates to a novel group of resinous materials which by virtue of their structural characteristics allow their use in conjunction with the benzyloxycarbonyl protecting group and possess certain other unusual beneficial properties when used in solid-phase peptide synthesis. The compounds of this invention can be characterized by the formula:

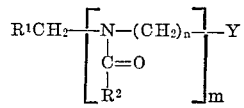

wherein
R$^1$ represents the phenyl portion of a styrene-divinylbenzene copolymer;
$n$ is a number between 2 and 6 inclusive;
$m$ is a number between 1 and 4 inclusive;
Y is OH or halo; and
R$^2$ is lower alkyl.

"Lower alkyl" as used herein represents methyl, ethyl, n-propyl, and isopropyl.

"Halo" is fluoro, chloro, bromo, or iodo.

Representative examples of the reactive substituents which can be attached to the basic styrene-divinylbenzene copolymer, hereinafter called resin, include:

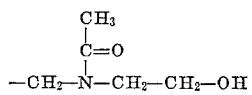

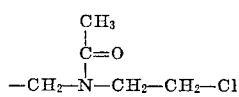

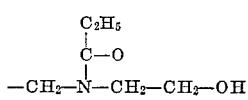

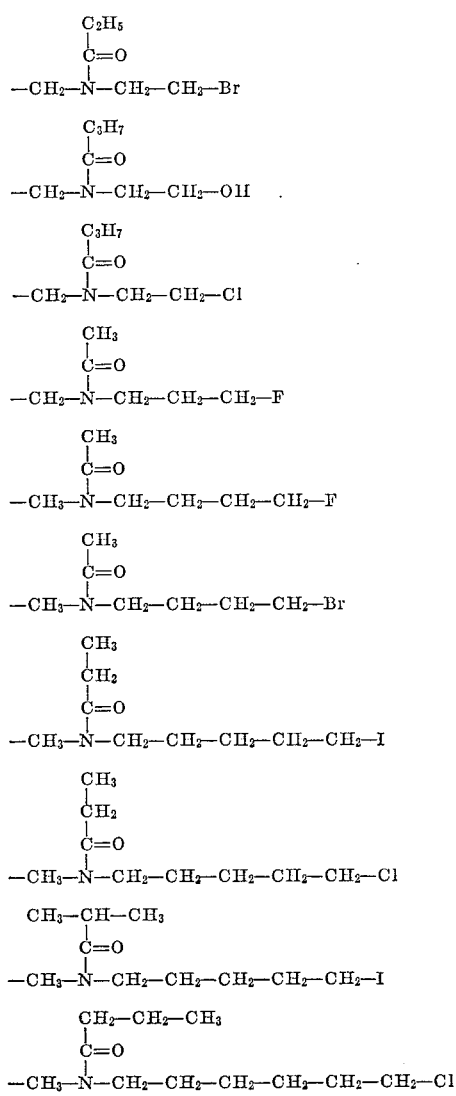

The compounds of this invention wherein Y is OH can be prepared by reacting the polymer disclosed by Merrifield (the benzyl chloride polymer) with an amino alkanol, and acylating the secondary nitrogen to form an amide.

Reaction of the resulting compounds with $SbF_5$, $PBr_5$, $PCl_5$, or the like will yield compounds wherein Y is halogen. The compounds of this invention wherein Y is halogen are reacted with the N-protected amino acid which will ultimately become the C-terminal amino acid of the peptide by refluxing the two reactants in an inert solvent for 24 to 72 hours in the presence of an organic tertiary-amine base. Examples of inert solvents useful for the reaction include methylene chloride, chloroform, trichloroethylene, ethanol, acetone, dioxane, diisobutyl ether, and the like. Examples of tertiary amines useful for the reaction include triethylamine, trimethylamine, triethylene diamine, N-ethyl piperidine, and the like.

The compounds of this invention wherein Y is equal to OH are reacted with the N-protected amino acid, which will become the C-terminal amino acid of the completed peptide, by reacting the two compounds in any of the above-mentioned inert solvents at or about ambient room temperature in the presence of dicyclohexylcarbodiimide or carbonyl bis-imidazole, or the like; or by activating the acid portion of the amino acid as by the formation of an acid chloride, acid anhydride, or mixed anhydride, or the like.

Removal of the N-protecting group and peptide formation steps are well-known to those persons skilled in the art.

For example, the benzyloxycarbonyl N-protecting group which can be used in conjunction with the C-protecting groups of this invention can be removed by hydrogen bromide in acetic acid, hydrogen iodide in acetic acid, hydrogen bromide in dioxane, hydrogen bromide in chloroform, trifluoroacetic acid, or the like.

The completed peptide can be removed from the C-terminal protecting group without scission of the peptide bond by treatment with 0.5 N–2 N sodium hydroxide, 0.5 N–2 N potassium hydroxide, aqueous triethylamine, or the like in a suitable solvent or mixture of solvents which will cause swelling of the resin.

Alternatively, the peptide-resin can be reacted with ammonia to cause amidification of the C-terminal amino acid, or it can be reacted by hydrazine to yield a hydrazide which can further be reacted to form an azide useful in the preparation of additional peptide bonds on the C-terminal amino acid.

The following examples will serve to further illustrate the general procedure of the preparation and use of the compounds of this invention, but are not meant to limit its scope in any manner.

Example I

Five grams of the $\alpha$-chloromethyl derivative of a two percent divinylbenzene in styrene copolymer (available from Bio-Rad Laboratories, Richmond, Calif.) were slurried in 40 ml. of dioxane, and 100 ml. ethanolamine were added slowly at room temperature. The mixture was heated with stirring for 5½ hours at 80° C. The solvent and excess ethanolamine were removed by filtration and the $\beta$-hydroxyethylaminomethyl resin was washed sequentially with dioxane, carbon tetrachloride, 95 percent aqueous dioxane, dioxane, and ether.

Elemental analysis.—Found: oxygen, 0.91; chlorine, 0.00; nitrogen, 2.02.

The $\beta$-hydroxyethylaminomethyl resin thus obtained (4.5 g.) was suspended in 30 ml. of dioxane, and 15 ml. of acetic anhydride were added. The mixture was agitated by a gentle rocking motion for 15 hours at ambient room temperature and the solvents then removed therefrom by decantation. The resulting product was washed with 100 ml. each of methylene chloride and then ether.

Elemental analysis.—Found: oxygen, 2.33; chlorine, 0.00; nitrogen, 2.07.

In order to remove any ester formed by the acetic anhydride reaction, the resulting resin was suspended in a mixture of 30 ml. of dioxane, 30 ml. of ethanol, 10 ml. of water, and 5 ml. of 2 N sodium hydroxide. This mixture was agitated by a gentle rocking motion for 3 hours at ambient room temperature. The solvents were removed by decantation and the resulting N-acetyl-$\beta$-hydroxyethylaminomethyl resin was washed sequentially with 95 percent aqueous ethanol, 95 percent aqueous dioxane, dioxane, and ether.

Elemental analysis.—Found: oxygen, 5.29; nitrogen, 1.68.

To a solution of 1.495 g. (5.0 mM.) N-benzyloxycarbonyl-L-phenylalanine in 50 ml. of methylene chloride, was added 0.850 g. (5.25 mM.) carbonyl bis-imidazole and the mixture was stirred for 30 minutes at ambient room temperature. The mixture was then treated portionwise with 5.0 g. of the above N-acetyl-$\beta$-hydroxyethylaminomethyl resin and the resulting slurry was stirred for 17 hours at ambient room temperature. Solvents were removed by decantation and the solid, N-benzyloxycarbonyl-L-phenylalanine N'-acetyl-$\beta$-hydroxyethylaminomethyl resin ester, was washed sequentially with 100 ml. each of methylene chloride, ethanol, water, ethanol, dioxane, and methylene chloride.

Amino acid analysis.—Found: Phe, 0.248 $\mu$M./mg.

The benzyloxycarbonyl group was removed by suspending the solid in 30 ml. of 30 percent hydrogen bromide in glacial acetic acid for 30 minutes at room temperature, then decanting therefrom the solvents and washing with 100 ml. each of acetic acid and then methylene chloride to yield L-phenylalanine N'-acetyl-β-hydroxyethylaminomethyl resin ester hydrobromide. The free base therefrom was prepared by neutralizing the salt with excess triethylamine in methylene chloride and washing the resulting solid with 100 ml. of methylene chloride.

A mixed anhydride, N-benzyloxycarbonyl-L-alanyl isobutyloxyformic anhydride was prepared by reacting 1.115 g. (5.0 mM.) N-benzyloxycarbonyl-L-alanine, 0.695 ml. (5.0 mM.) triethylamine, and 0.679 ml. (5.25 mM.) isobutylchloroformate in 50 ml. methylene chloride at −15° C. for 15 minutes. To the mixed anhydride was added the above L-phenylalanine N'-acetyl-β-hydroxyethylaminomethyl resin ester and the resulting slurry was stirred at −15° C. for 5 hours and at ambient room temperature for 16 hours. The solvents were decanted and the solid was sequentially washed with 100 ml. each of methylene chloride, ethanol, acetic acid, and methylene chloride.

Amino acid analysis.—Found: Ala, 0.225 μM./mg.; Phe, 0.241 μM./mg.

To the resulting solid, N-benzyloxycarbonyl-L-alanyl-L - phenylalanine N'-acetyl-β-hydroxyethylaminomethyl resin ester, in 25 ml. of dioxane were added 25 ml. of 0.1 N NaOH in anhydrous ethanol. The slurry was shaken for four hours at room temperature and the liquid phase then removed by decantation. The resin was washed sequentially with 30 ml. each of 95 percent aqueous ethanol, 95 percent aqueous dioxane, dioxane, and methylene chloride, and all the liquids were combined and evaporated to dryness in vacuo. The resulting oil was dissolved in a two-phase mixture of 50 percent aqueous ethyl acetate and acidified with 1 N phosphoric acid. The layers were separated and the organic layer was washed with a saturated sodium chloride solution until it was neutral. The ethyl acetate was evaporated in vacuo and the resulting oil dissolved in acetic acid and lyophilized. The solid product, N-benzyloxycarbonyl-alanyl-L-phenylalanine, weighed 360 mg. (97.4 percent overall yield).

Amino acid analysis.—Found: Ala, 2.35 μM./mg.; Phe, 2.22 μM./mg.

A 350 mg. portion of the N-benzyloxycarbonyl-L-alanyl-L-phenylalanine was deprotected with 30 percent hydrogen bromide in glacial acetic acid in the manner shown above. Peptide analysis proved this material to be the desired dipeptide.

Example II

Example I was repeated in all essential detail using aminohexanol in place of aminoethanol to prepare the resin base useful for the ester formation. As a result of this procedure the reactive side-chain on the styrene-divinylbenzene copolymer was N-acetyl-6-hydroxyhexylaminomethyl.

Analysis.—Calc'd: Cl, None. Found: Cl, None; N, 1.85 percent.

Example III

Ten grams of the α-chloromethyl (3.3% Cl) derivative of the 2% divinylbenzene in styrene copolymer were slurried in 40 ml. of dioxane and 10 g. of 6-aminohexanol were added. The mixture was heated with stirring for 5 hours at 85° C. The solvent and excess 6-aminohexanol were removed by filtration and the resin washed sequentially with dioxane, carbon tetrachloride, 95% aqueous dioxane, dioxane, and ether.

The resulting solid was treated with a solution of 20 ml. thinoyl chloride in methylene chloride for 16 hours at 25° C. The solvents were removed by filtration and the resulting resin acetylated with 50 ml. acetic anhydride in dioxane at 50° C. for 4 hours.

Analysis.—Found: N, 0.68%.

The above resin was slurried in 40 ml. of dioxane and 10 g. 6-aminohexanol were added. The mixture was heated at 85° C. for 16 hours, then cooled. The solvents were removed by filtration and the resulting resin acetylated in the manner previously described to yield N,N'-diacetylhydroxyhexylaminohexylaminomethyl resin.

Analysis.—Found: N, 1.67%.

I claim:
1. A compound of the formula

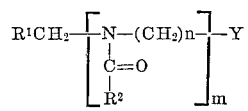

wherein
R¹ is the phenyl portion of a styrene-divinylbenzene copolymer (resin);
R² is a lower alkyl;
Y is OH or halo;
m is a number between 1 and 4 inclusive; and
n is a number between 2 and 6 inclusive.

2. A compound as in claim 1, said compound being N-acetylhydroxyhexylaminomethyl resin.

3. A compound as in claim 1, said compound being N-acethylhydroxyhexylaminomethyl resin.

4. A compound as in claim 1, said compound being N,N'-diacetylhydroxyhexylaminohexylaminomethyl resin.

References Cited

Letsinger, Mahadevan and Jerina: Reactions on Polymer Supports, Journal American Chemical Society, Dec. 5, 1964, pp. 5163–65.

JOSEPH L. SCHOFER, Primary Examiner

ROGER S. BENJAMIN, Assistant Examiner

U.S. Cl. X.R.

260—112.5

PO-1050
(5/69)

UNITED STATES PATENT OFFICE
CERTIFICATE OF CORRECTION

Patent No. 3,485,810    Dated   December 23, 1969

Inventor(s)   Manohar A. Tilak

It is certified that error appears in the above-identified patent and that said Letters Patent are hereby corrected as shown below:

Column 1, line 31, the left-hand formula in the equation reading 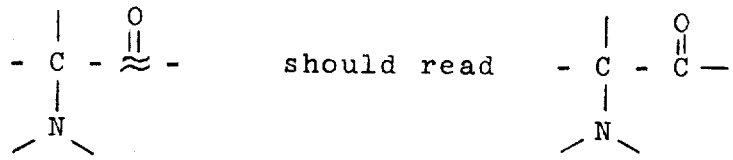

Column 2, line 12, delete "with"; line 70, that portion of the formula reading 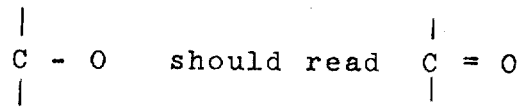

Column 4, line 17, delete "by" and replace with --with--

Column 6, line 14, delete "thinoyl" and replace with --thionyl-- line 41, delete "N-acetylhydroxyhexylaminomethyl" and replac with --N-acetyl-β-hydroxyethylaminomethyl--;

line 43, delete "N-acethylhydroxyhexylaminomethyl" and repla with --N-acetylhydroxyhexylaminomethyl--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents